(12) United States Patent
Kim et al.

(10) Patent No.: US 12,155,029 B2
(45) Date of Patent: Nov. 26, 2024

(54) MATERIAL, NEGATIVE ELECTRODE COMPRISING SAME AND METHODS FOR MANUFACTURING SAME

(71) Applicant: LG CHEM, LTD., Seoul (KR)

(72) Inventors: Ye Ri Kim, Daejeon (KR); Sang Wook Woo, Daejeon (KR); Oh Byong Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1008 days.

(21) Appl. No.: 17/255,453

(22) PCT Filed: Jan. 20, 2020

(86) PCT No.: PCT/KR2020/000969
§ 371 (c)(1),
(2) Date: Dec. 23, 2020

(87) PCT Pub. No.: WO2020/153690
PCT Pub. Date: Jul. 30, 2020

(65) Prior Publication Data
US 2021/0273212 A1     Sep. 2, 2021

(30) Foreign Application Priority Data
Jan. 21, 2019  (KR) .......................... 10-2019-0007734

(51) Int. Cl.
*H01M 10/0525*  (2010.01)
*B22F 1/102*   (2022.01)
(Continued)

(52) U.S. Cl.
CPC ......... *H01M 10/0525* (2013.01); *B22F 1/102* (2022.01); *B22F 9/04* (2013.01);
(Continued)

(58) Field of Classification Search
CPC .......................... H01M 10/0525; H01M 4/364
See application file for complete search history.

(56) References Cited

U.S. PATENT DOCUMENTS

| 2007/0224508 A1 | 9/2007 | Aramata et al. |
| 2016/0126582 A1* | 5/2016 | Xiao ..................... H01M 4/136 |
| | | 429/126 |

(Continued)

FOREIGN PATENT DOCUMENTS

| CN | 105684208 A | 6/2016 |
| CN | 106663775 A | 5/2017 |

(Continued)

OTHER PUBLICATIONS

International Search Report (PCT/ISA/210) issued in PCT/KR2020/000969, dated Apr. 29, 2020.

*Primary Examiner* — Sadie White
*Assistant Examiner* — Kayla Elaine Clary
(74) *Attorney, Agent, or Firm* — Birch, Stewart, Kolasch & Birch, LLP

(57) ABSTRACT

A method for manufacturing negative electrode active material including the steps of manufacturing a pellet by extruding a mixture of lithium metal and negative electrode active material, immersing the pellet in an electrolyte comprising an SEI film-forming additive, and manufacturing the pellet into powder form by grinding, washing and drying same. A negative electrode and a lithium rechargeable battery manufactured using the lithium-active material powder has an SEI film that is uniformly formed by having lithium uniformly doped in the negative electrode. During initial charging, the SEI film is stably formed, and thus an effect is achieved whereby the initial efficiency of the lithium rechargeable battery is improved.

10 Claims, 2 Drawing Sheets

(51) Int. Cl.
*B22F 9/04* (2006.01)
*H01M 4/02* (2006.01)
*H01M 4/04* (2006.01)
*H01M 4/36* (2006.01)
*H01M 4/38* (2006.01)
*H01M 4/583* (2010.01)
*H01M 10/0567* (2010.01)
*H01M 10/0568* (2010.01)
*H01M 10/0569* (2010.01)

(52) U.S. Cl.
CPC ......... *H01M 4/0404* (2013.01); *H01M 4/364* (2013.01); *H01M 4/366* (2013.01); *H01M 4/382* (2013.01); *H01M 4/583* (2013.01); *H01M 10/0567* (2013.01); *H01M 10/0568* (2013.01); *H01M 10/0569* (2013.01); *H01M 2004/021* (2013.01); *H01M 2004/027* (2013.01); *H01M 2300/0028* (2013.01)

(56) References Cited

U.S. PATENT DOCUMENTS

| | | | |
|---|---|---|---|
| 2016/0141596 A1* | 5/2016 | Uhm | H01M 4/0435 |
| | | | 429/231.95 |
| 2016/0260967 A1 | 9/2016 | Matus et al. | |
| 2016/0351893 A1 | 12/2016 | Wietelmann et al. | |
| 2017/0110719 A1 | 4/2017 | Wang et al. | |
| 2017/0365854 A1* | 12/2017 | Gopalakrishnannair | |
| | | | H01M 50/457 |
| 2018/0269524 A1 | 9/2018 | Haufe et al. | |
| 2019/0019629 A1 | 1/2019 | Makino et al. | |
| 2019/0305298 A1 | 10/2019 | Chae et al. | |
| 2020/0168894 A1* | 5/2020 | Jang ...................... | H01M 4/502 |

FOREIGN PATENT DOCUMENTS

| | | |
|---|---|---|
| CN | 107799721 A | 3/2018 |
| JP | 5-266883 A | 10/1993 |
| JP | 8-31454 A | 2/1996 |
| JP | 9-92333 A | 4/1997 |
| JP | 10-270085 A | 10/1998 |
| JP | 2008-16192 A | 1/2008 |
| JP | 5947198 B2 | 7/2016 |
| KR | 10-1461665 B1 | 11/2014 |
| KR | 10-2016-0121564 A | 10/2016 |
| KR | 10-2016-0145605 A | 12/2016 |
| KR | 10-2017-0126480 A | 11/2017 |
| KR | 10-2018-0041733 A | 4/2018 |
| KR | 10-2018-0127044 A | 11/2018 |
| WO | WO2018/212453 A1 | 11/2018 |

* cited by examiner

[FIG. 1]
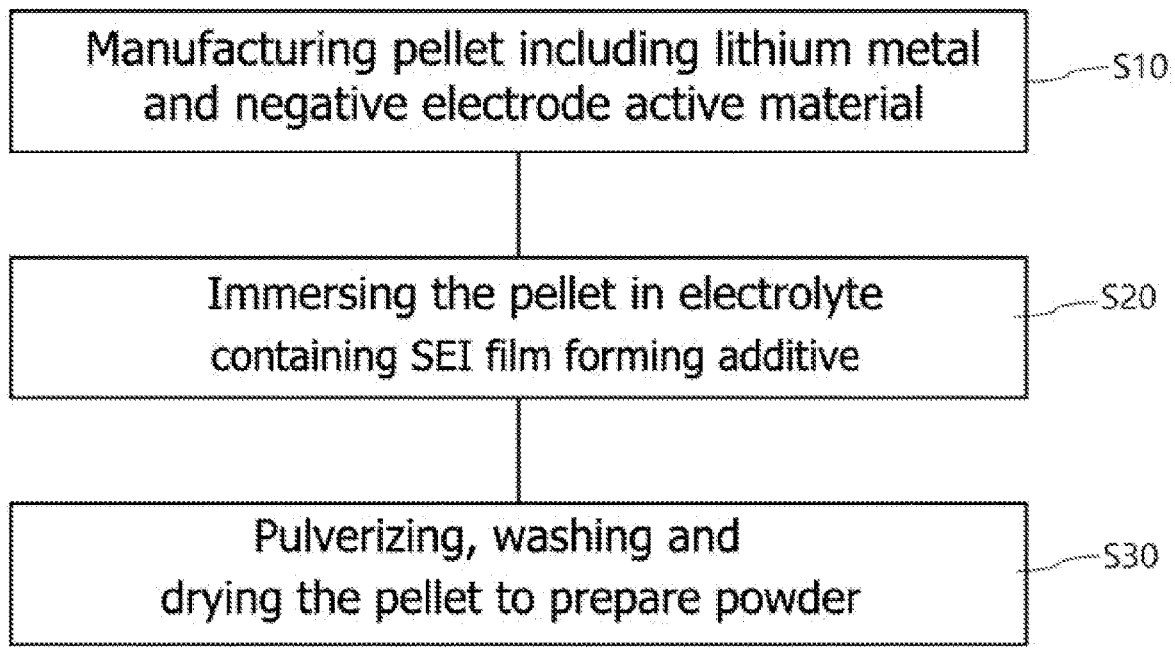
[FIG. 2]
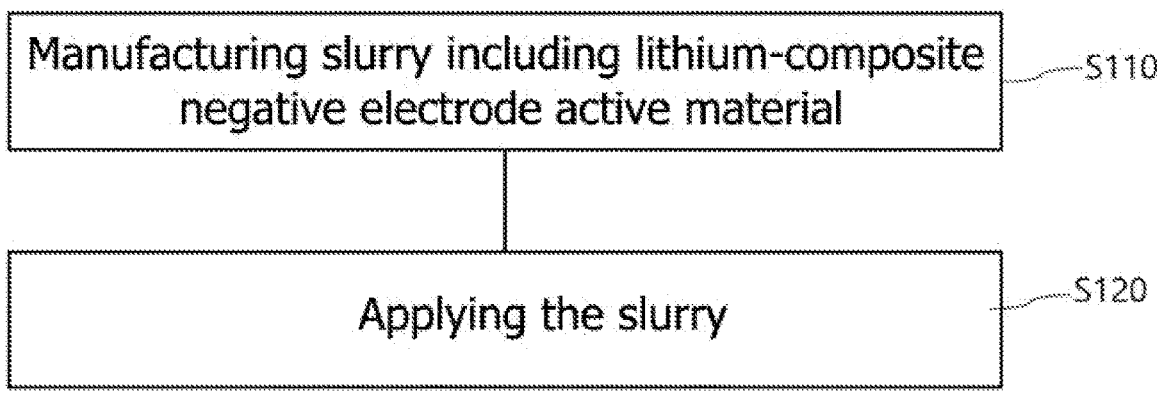

[FIG. 3]
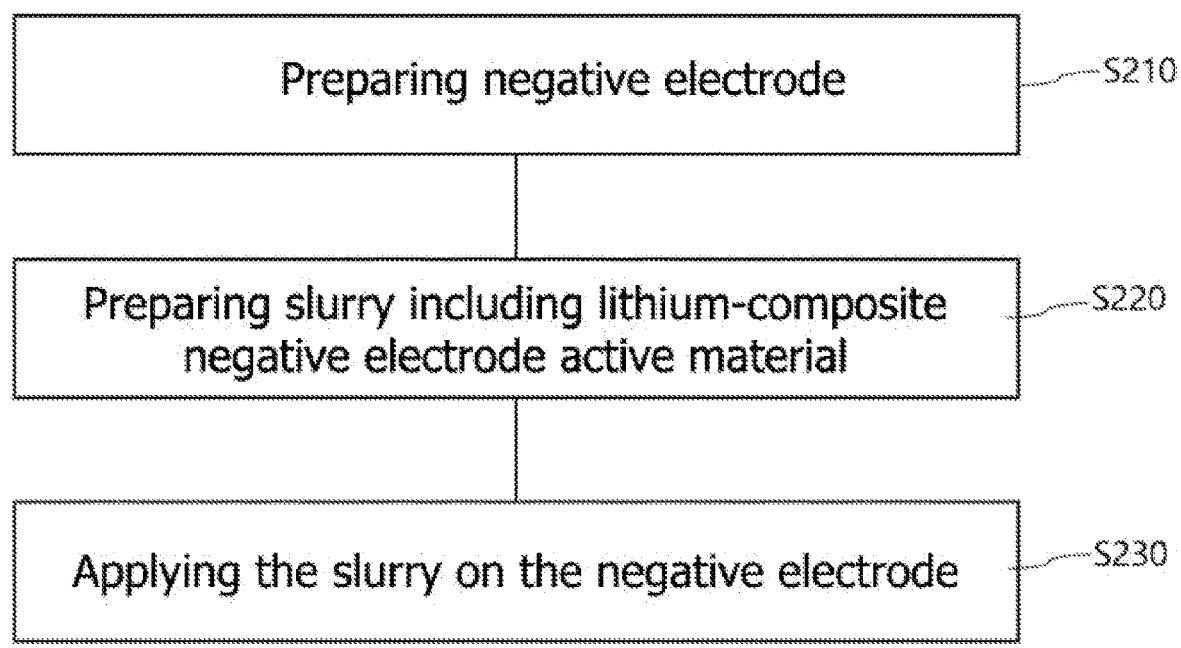

MATERIAL, NEGATIVE ELECTRODE COMPRISING SAME AND METHODS FOR MANUFACTURING SAME

TECHNICAL FIELD

This application claims the benefit of priority based on Korean Patent Application No. 10-2019-0007734, filed on Jan. 21, 2019, and the entire contents of the Korean patent application are incorporated herein by reference.

The present invention relates to a negative electrode active material containing lithium, a negative electrode including the same, and a method for manufacturing the same, and more specifically, to a method of manufacturing a lithium composite negative electrode active material for improving initial efficiency, and a lithium composite negative electrode active material and a lithium composite negative electrode including the same.

BACKGROUND ART

As technologies for mobile devices are developed and demand for the mobile devices increases, there has been a rapid increase in demand for secondary batteries as energy sources. Among such secondary batteries, lithium secondary batteries, which exhibit a high energy density and operational potential, a long cycle life, and a low self-discharge rate have been commercialized and widely used.

Since a conventional lithium secondary battery uses a compound in which lithium is inserted, such as $LiCoO_2$ or $LiMn_2O_4$, as a positive electrode, the battery is manufactured in a state in which lithium is not inserted into a carbon electrode used as a negative electrode. In the case of a carbon electrode, a SEI (Solid Electrolyte Interface) film is formed on the surface of the carbon electrode during initial charging. This film prevents the insertion of an organic solvent between the carbon lattice layers and suppresses the decomposition reaction of the organic solvent, thereby improving the stabilization of the carbon structure and reversibility of the carbon electrode, thereby enabling use as a negative electrode for lithium secondary batteries. However, since this film-forming reaction is an irreversible reaction, there is also an adverse effect of reducing the capacity of the battery by consuming lithium ions. In addition, since the charging and discharging efficiency of the carbon electrode and the positive electrode is not completely 100%, the consumption of lithium ions occurs as the number of cycles progresses, resulting in a decrease in the electrode capacity, which in turn leads to a decrease in cycle life.

On the other hand, if a pre-lithiated carbon electrode is used as a negative electrode, since the film-forming reaction that occurs during initial charging is preliminary, it is possible to manufacture a high-capacity lithium secondary battery without lowering the capacity, and as the number of cycles increases, the consumption of lithium ions, which appear, can be replenished, thereby significantly improving cycle life.

Accordingly, research on a method of pre-lithiating the carbon electrode has been actively conducted. Representatively, a method of manufacturing an electrode after lithiating a carbon active material by a physicochemical method, and a method of electrochemically pre-lithiating a carbon electrode are considered.

The electrochemical method has a disadvantage that the process is complicated and somewhat difficult. The physicochemical method is a method of incorporating the lithium into the negative electrode by rolling the lithium foil and the negative electrode through the upper and lower rolls, and since a large amount of lithium is incorporated into the negative electrode active material in a short time, it is possible to generate a structural change in the negative electrode active material itself, so proper synthesis conditions are required.

DISCLOSURE

Technical Problem

An object of the present invention is to provide a negative electrode and a lithium secondary battery for a lithium secondary battery with improved initial efficiency in comparison with a conventional method for preliminary lithiation of a negative electrode.

Technical Solution

A method of manufacturing a negative electrode active material of the present invention for solving the above problems includes: a first step of preparing a pellet by extruding a mixture of lithium metal and a negative electrode active material (S10); a second step of immersing the pellet in an electrolyte containing an SEI film forming additive (S20); and a third step of pulverizing, washing and drying the pellet to prepare a powder of the lithium composite negative electrode active material (S30).

In one embodiment of the invention, the SEI film forming additive may be at least one selected from the group consisting of a cyclic carbonate compound; a cyclic or chain carbonate-based compound containing halogen atoms; a lithium salt containing an oxalato complex as an anion; imide-based lithium salt; fluorophosphate-based lithium salt; fluoroborate-based lithium salt; a six-membered aromatic heterocyclic compound containing two or more nitrogen atoms in a molecule; a sultone compound; and an acrylate-based compound.

In one embodiment of the invention, the SEI film forming additive may preferably be at least one selected from the group consisting of fluoro ethylene carbonate and vinylene carbonate, and may most preferably be a mixture of fluoro ethylene carbonate and vinylene carbonate in a weight ratio of 2:1 to 1:2.

In one embodiment of the invention, the SEI film forming additive may be present in the electrolyte in an amount of 0.1 wt % to 5 wt % based on a total weight of the electrolyte.

In one embodiment of the invention, the negative electrode active material in the first step of manufacturing the pellet (S10) may be a carbonaceous material.

In one embodiment of the invention, in the first step (S10) of manufacturing the pellet, the negative electrode active material and the lithium metal may be mixed at a capacity ratio of 5:1 to 1:3.

In the second step (S20) of immersing the pellet in the electrolyte, lithium ions may be doped with the negative electrode active material.

Time for immersing the pellet in the electrolyte may be 12 hours to 60 hours.

In addition, the present invention provides a lithium composite negative electrode active material prepared by the above method.

Further, the present invention provides a method for manufacturing a lithium composite negative electrode, including: a first step of preparing a slurry including the lithium composite negative electrode active material (S110); and a second step of applying the slurry on the current collector (S120).

At this time, the slurry containing the lithium composite negative electrode active material may further include a conductive material and a binder.

Further, the slurry containing the lithium composite negative electrode active material may further include a second type of negative electrode active material.

A method for manufacturing a lithium composite negative electrode of the present invention may also include: a first step of preparing a negative electrode by applying a negative electrode slurry on a current collector (S210); a second step of preparing a slurry including the lithium composite negative electrode active material (S220) ; and a third step of applying the slurry containing the lithium-composite negative electrode active material on the negative electrode (S230).

The present invention provides a lithium composite negative electrode prepared by the above method and a lithium secondary battery including the same.

Advantageous Effects

According to the present invention, since lithium is uniformly doped in a negative electrode, a SEI film is uniformly formed, and the SEI film is stably formed during initial charging, it has the effect of significantly improving the initial efficiency and cycle life of a lithium secondary battery.

BRIEF DESCRIPTION OF THE DRAWINGS

FIG. 1 is a flowchart of a method for manufacturing a lithium composite negative electrode active material according to the present invention.

FIG. 2 is a flowchart of a method of manufacturing a lithium-composite negative electrode according to an embodiment of the present invention.

FIG. 3 is a flowchart of a method of manufacturing a lithium-composite negative electrode according to another embodiment of the present invention.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

FIG. 1 shows a method of manufacturing a lithium composite negative electrode active material according to an embodiment of the present invention. Referring to FIG. 1, the method of manufacturing a lithium composite negative electrode active material according to the present invention includes: a step of preparing a pellet by extruding a mixture of lithium metal and negative electrode active material (S10); a step of immersing the pellet in an electrolyte solution containing an SEI film forming additive (S20); and a step of pulverizing, washing and drying the pellet to prepare powder (S30).

In the method of prelithiating a negative electrode by direct contact with lithium metal, it is difficult for the lithium metal to be uniformly inserted into the negative electrode active material, and thus lithium deficiency may be partly caused, and as a large amount of lithium ions are inserted, structural changes in the negative electrode active material itself may be partly caused.

Accordingly, in the present invention, after mixing the lithium metal and the negative electrode active material and then compressing it to produce a pellet, a method of immersing the pellet in an electrolyte solution is introduced to uniformly inject lithium metal into the negative electrode active material. Thereafter, an SEI film is stably formed by including an SEI film forming additive in the electrolyte, thereby improving the initial efficiency and cycle life of the lithium secondary battery.

First, the step of manufacturing the pellet will be described.

The step of manufacturing the pellets is a step of uniformly mixing the raw material used as a negative electrode active material with lithium metal, and compressing the mixture to produce pellets.

The negative electrode active material is a compound capable of reversible intercalation and deintercalation of lithium and specific examples thereof include: carbonaceous materials such as artificial graphite, natural graphite, graphitized carbon fiber, and amorphous carbon; metallic compounds capable of alloying with lithium such as Si, Al, Sn, Pb, Zn, Bi, In, Mg, Ga, Cd, Si alloy, Sn alloy or Al alloy; metal oxide capable of doping and dedoping lithium, such as $SiO_x$ (0<x<2), $SnO_2$, vanadium oxide and lithium vanadium oxide; or composites containing the above metallic compounds and carbonaceous materials, such as Si—C composites or Sn—C composites, and any one or more mixtures thereof may also be used.

As the carbon material, low crystalline carbon and high crystalline carbon may be used. Examples of the low-crystalline carbon include soft carbon and hard carbon. Examples of the highly crystalline carbon include amorphous, flaky, scaly, spherical or fibrous natural graphite or artificial graphite, Kish graphite, pyrolytic carbon, mesophase pitch based carbon fiber, meso-carbon microbeads, mesophase pitches and petroleum or coal tar pitch derived cokes.

Particularly, natural graphite having a high capacity as a carbon-based material or artificial graphite having excellent high temperature characteristics may be preferably used, and the average particle diameter ($D_{50}$) of the graphite particles may be 10 μm to 30 μm, preferably 15 μm to 25 μm.

The lithium metal may be supplied in the form of powder, foil, bulk, etc., preferably powder. The average particle diameter ($D_{50}$) of the lithium metal in the powder form may be 1 to 100 μm, preferably 10 to 85 μm, and more preferably 25 to 60 μm. The average particle diameter ($D_{50}$) means a particle diameter in which the accumulation becomes 50% from the smallest particle in the order of particle diameter, and the particle diameter can be measured using a laser diffraction method. The laser diffraction method can generally measure a particle diameter of several mm from a submicron region, and can obtain results of high reproducibility and high resolution.

The ratio of the particle diameter of the negative electrode active material to that of the powdered lithium metal is preferably 1:1 to 1:5. When the ratio of the particle diameters satisfies the above numerical range, a uniform morphology can be maintained, and agglomeration of lithium metal can be prevented.

When negative electrode active material and lithium metal are mixed, in the case that the theoretical capacity of the negative electrode active material is 360 mAh/g and the lithium ion capacity is 3860 mAh/g, the negative electrode active material and the lithium metal are preferably mixed at a capacity ratio of 5:1 to 1:3, and more preferably 4:1 to 1:2. If the capacity ratio of the negative electrode active material is relatively high because the capacity ratio exceeds 5:1 outside the above range, the effect of reducing the irreversible capacity of the negative electrode may be small. When the capacity ratio of lithium is relatively high because the capacity ratio is less than 1:3, lithium is excessively contained and dendrites may be formed during initial charging. These cases are not desirable.

The method of mixing the lithium metal and the negative electrode active material is not particularly limited. In the space under an inert gas atmosphere or in a space where moisture is controlled (glove box or dry room), lithium metal in the form of powder and negative electrode active material may be quantified by the corresponding capacity ratio, and then put in a bottle and shaken by hand to be mixed.

When the negative electrode active material is mixed with lithium metal, a solid reaction between a solid negative electrode active material and a solid lithium metal may occur, but since the diffusion rate of lithium in solids is generally small, it is difficult for lithium to be uniformly penetrated into the negative electrode active material, and thus, an immersion step of an electrolyte to be described later is performed.

After the negative electrode active material and lithium metal are mechanically well mixed under an inert gas atmosphere, the mixture is put into an extruder. The mixture is put into an extruder and compressed to be manufactured in the form of a pellet. The diameter of the pellet may be 0.5 to 2 cm, preferably 1 to 1.5 cm, and the height of the pellet may be 0.1 to 1 cm, preferably 0.3 to 0.7 cm.

Next, the step (S20) of immersing the pellet obtained as described above in an electrolyte will be described. In the step of immersing the pellets, pellets made of a mixture of negative electrode active material and lithium metal are immersed in an electrolyte to allow lithium ions of lithium metal to be doped within the lattice structure of the negative electrode active material, and to form a SEI coating layer on the surface of the negative electrode active material in advance.

By directly contacting the lithium metal to the negative electrode, lithium can be doped into the negative electrode to preliminarily lithiate the negative electrode. However, as a result of preliminary lithiation by direct contact, lithium ions are doped non-uniformly in the negative electrode, and as a result, the SEI film is formed uniformly, so that the effect of reducing irreversible capacity may not be large. However, as in the present invention, when a mixture in which lithium metal and a negative electrode active material are uniformly mixed is made into pellets and the pellets are immersed in an electrolyte, lithium can be uniformly doped inside the layered structure of the negative electrode active material. As such, it has the effects of improving the initial efficiency as it becomes possible to form a more uniform SEI film compared to preliminary lithiation by conventional direct contact.

In addition, in the present invention, by including the additive for forming the SEI film in the electrolyte to immerse the pellet, the SEI film is preliminarily formed in the step of immersing the pellet in the electrolyte, so that when the SEI film is formed by a later activation process, the SEI film formation is more stably accelerated, which is more advantageous for improving the initial efficiency.

The electrolyte solution contains a non-aqueous organic solvent, a lithium salt, and an additive for SEI film formation. The non-aqueous organic solvent serves as a medium through which ions involved in the electrochemical reaction can move, and it is appropriate to use a solvent that exhibits desired properties together with the SEI film forming additive.

Specifically, the non-aqueous organic solvent may be a cyclic carbonate-based solvent such as ethylene carbonate (EC), propylene carbonate (PC) or butylene carbonate (BC); a linear carbonate-based solvent such as dimethyl carbonate (DMC), diethyl carbonate (DEC), dipropyl carbonate (DPC), ethyl methyl carbonate (EMC), methylpropyl carbonate (MPC) or ethylpropyl carbonate (EPC); an ester solvent such as methyl acetate, ethyl acetate, γ-butyrolactone, or ε-caprolactone; an ether-based solvent such as dibutyl ether or tetrahydrofuran; or a ketone-based solvent such as cyclohexanone, and any one or a mixture of two or more of these can be used. Among them, when considering SEI film forming properties, the organic solvent may be a mixture of cyclic carbonate and linear carbonate, and more specifically, it may be a mixture in which a content of the linear carbonate is higher than that of the cyclic carbonate. Specifically, the mixed volume ratio of the linear carbonate and the cyclic carbonate may be 5:5 to 8:2.

The lithium salt of the electrolyte is a source of lithium ions, and any compound capable of providing lithium ions can be used without particular limitation.

Specifically, some examples of the lithium salt may include $LiPF_6$, $LiAsF_6$, $LiBF_4$, $LiSbF_6$, $LiAlO_4$, $LiAlCl_4$, $LiSO_3CF_3$ or $LiClO_4$, and any one or a mixture of two or more of them may be used.

Further, the lithium salt may be included at a concentration of 0.5 mol/l to 2 mol/l. When the concentration of the lithium salt is less than 0.5 mol/l, the amount of lithium ions supplied is not sufficient, and when it exceeds 2 mol/l, the viscosity of the electrolyte for forming an SEI film increases, and there is a possibility that the SEI film formability is lowered. When considering the conductivity of lithium ions in the SEI film and SEI film forming properties, the lithium salt may be more specifically included in the SEI film-forming electrolyte at a concentration of 0.5 mol/l to 1.6 mol/l.

The SEI film forming additive of the present invention is a compound capable of forming an SEI film by an electrochemical oxidation or reduction decomposition reaction, and forms a stable SEI layer, and suppresses peeling of a carbon layered structure or direct reaction with an electrolyte.

The SEI film forming additive may specifically include: a cyclic carbonate-based compound containing an unsaturated bond; a cyclic or chain carbonate-based compound containing halogen atoms; a lithium salt containing an oxalato complex as an anion; imide-based lithium salt; fluorophosphate-based lithium salt; fluoroborate-based lithium salt; a six-membered aromatic heterocyclic compound containing two or more nitrogen atoms in the molecule; a sultone compound; or an acrylate-based compound, and any one or a mixture of two or more of these can be used.

The cyclic carbonate-based compound containing the unsaturated bond may be: a vinylene carbonate-based compound such as vinylene carbonate, methyl vinylene carbonate, ethyl vinylene carbonate, propyl vinylene carbonate, dimethyl vinylene carbonate, or vinylene ethylene carbonate; or a vinyl ethylene carbonate-based compound such as vinyl ethylene carbonate, and any one or a mixture of two or more of these can be used.

The cyclic or chain carbonate-based compound containing the halogen atom may be: a cyclic carbonate-based compound containing at least one halogen atom in the molecule, such as fluoro ethylene carbonate or difluoro ethylene carbonate; and a chain carbonate-based compound containing at least one halogen atom in the molecule, such as fluoromethylmethyl carbonate or bis (fluoromethyl) carbonate, and any one or a mixture of two or more of these can be used.

Any lithium salt can be used as the lithium salt having the oxalato complex as an anion without limitation as long as the anion compound containing the oxalato group and lithium ion form a complex compound through coordination bonds and the like. Specifically, lithium difluoro (oxalato) borate (LiODFB), lithium tetrafluoro (oxalato) phosphate (LiTFOP), lithium tris (oxalate) phosphate (LTOP) or lithium bis (oxalato) borate (LiBOB), etc. may be used, and any one of these, or a mixture of two or more can be used.

Some examples of the lithium salt for forming an SEI film other than the lithium salt having the oxalato complex as an anion include: imide-based lithium salt such as lithium bisfluorosulfonyl imide (LiF SI), lithium bistrifluoromethanesulfonylimide (LiTFSI), or lithium bis (perfluoroethylsulfonyl imide) (LiBETI); and fluorophosphate-based lithium salt such as $LiBF_4$, lithium difluorophosphate ($LiF_2O_2P$) or lithium fluorophosphates ($Li_2PO_3F$), and the above compounds may be used alone or in combination of two or more in the form of a mixture.

A lithium salt, an imide-based lithium salt or a fluorophosphate-based lithium salt having an oxalato complex usable as the SEI film-forming agent as an anion can also be used as a lithium salt in the composition for forming a SEI film. In this case, lithium salt, imide-based lithium salt, or fluorophosphate-based lithium salt having the above-mentioned oxalato complex as an anion may be included by the amount in which the total concentration of the lithium salt contained in the composition for forming an SEI film satisfies the lithium salt concentration condition in the composition for forming an SEI film, and at the same time, the SEI film former content condition is satisfied.

The six-membered aromatic heterocyclic compound containing two or more nitrogen atoms in the molecule may be, for example, pyrimidine and 1,3,5-triazine, and any one or a mixture of two or more of them.

The sultone-based compound may be specifically 1,3-propane sultone (PS), 1,4-butane sultone or 1,3-propenesultone, and any one or a mixture of two or more of these can be used.

According to an embodiment of the present invention, since vinylene carbonate and fluoro ethylene carbonate have a cyclic structure, the structure is not stable due to ring modification, and thus has reactivity to change to a more stable structure through a ring-opening reaction. As such, even with a small amount added, the SEI film can be effectively formed to reduce the irreversible capacity of the carbon-based negative electrode. In particular, the effect was high in the PC-based electrolyte. Further, even when an excessive amount was added, it did not cause any problems in the performance of the battery, which was very advantageous for process control in the manufacture of the battery. Hence, it is most preferable to select vinylene carbonate or fluoro ethylene carbonate or mixtures thereof as the SEI film forming additive of the present invention.

The SEI film-forming additive is preferably 0.1 to 5 wt %, more preferably 1 to 3 wt %, based on the total weight of the electrolyte. If it is less than 0.1 wt %, it is difficult to achieve the object of the present invention, and when it exceeds 5 wt %, it is not preferable from the viewpoint of economic efficiency.

In one embodiment of the present invention, the SEI film-forming additive has a more advantageous effect in increasing the initial efficiency when using vinylene carbonate and fluoro ethylene carbonate in combination than when using vinylene carbonate or fluoro ethylene carbonate alone.

The time for immersing the pellet in the electrolyte is 12 to 60 hours, more preferably 18 to 54 hours, and most preferably 24 to 48 hours. When the immersion time of the electrolyte is less than 12 hours, initial efficiency improvement may be insignificant, which is undesirable, and when it exceeds 60 hours, it is not preferable from the viewpoint of productivity.

When immersing the pellet in the electrolyte, it is preferable to control the temperature to start at a temperature between 5° C. and room temperature (about 23 to 25° C.) to avoid violent reactions.

Next, the step (S30) of preparing a pellet having been immersed in the electrolyte, in a powder form will be described.

The step of manufacturing in the powder form is a step of taking out the pellet in the electrolyte, and then pulverizing, washing, and drying the pellet to be prepared as a powder form. The electrode of the secondary battery is prepared by applying an electrode slurry containing an electrode active material on a current collector. Since the pellet in the state impregnated with the electrolyte cannot be applied directly to the current collector, it is a step of processing in an easy form to manufacture the electrode.

Since the pellet is hard, it is easy to clean when it is crushed before washing. If necessary, after washing the pulverized pellet, the process of pulverizing and washing again may be repeated.

Any kind of solvent capable of cleaning the electrolyte and foreign substances remaining in the pellets and having a low dielectric constant and being volatile may be used as a solvent for washing pellets. The pellet contains lithium, and a solvent having a low dielectric constant is preferable to minimize the loss of lithium from the pellet during the washing process, and a volatile solvent is preferable because the washing solvent should be easily removed after washing. In one embodiment of the present invention, dimethyl carbonate was used as a washing solvent. After washing and grinding, the pellet is dried by applying a vacuum at room temperature.

After the step of preparing the powdered lithium composite negative electrode active material as described above, the lithium composite negative electrode may be manufactured using the lithium composite negative electrode active material. Hereinafter, a method of manufacturing the lithium-composite negative electrode of the present invention will be described.

FIG. 2 is a flowchart of a method of manufacturing a lithium-composite negative electrode according to an embodiment of the present invention. Referring to FIG. 2, the method of manufacturing a lithium-composite negative electrode of the present invention includes: preparing a slurry containing the lithium-composite negative electrode active material (S110); and applying the slurry on the current collector (S120).

FIG. 3 is a flowchart of a method of manufacturing a lithium-composite negative electrode according to another embodiment of the present invention. Referring to FIG. 3, the method of manufacturing a lithium-composite negative electrode of the present invention includes the steps of: preparing a negative electrode by applying a negative electrode slurry on a current collector (S210); preparing a slurry containing the lithium composite negative electrode active material (S220); and applying a slurry containing the lithium composite negative electrode active material to the negative electrode (S230).

As described above, the lithium-composite negative electrode of the present invention can be prepared by preparing a slurry containing the lithium composite negative electrode active material, and then applying the slurry on the negative electrode current collector (single coating). Alternatively, the lithium-composite negative electrode of the present invention can also be prepared by preparing a slurry containing the lithium composite negative electrode active material, and then applying the slurry on the surface of the negative electrode (double coating). When producing a negative electrode by a single coating method, the slurry may include only the lithium composite negative electrode active material of the present invention, and additionally, other types of negative electrode active materials, conductive materials and binders may be further included.

Generally, in order to manufacture a positive electrode and a negative electrode, the electrode-forming slurry in which each electrode active material, a conductive material, and a binder are dispersed in a solvent is coated on current collector and is then dried, or the electrode forming slurry is cast on a separate support, and the film obtained by peeling from this support is then laminated on the current collector. The lithium composite negative electrode of the present invention contains the above-mentioned lithium composite negative electrode active material in the negative electrode.

As the solvent used in preparing the slurry using the lithium composite negative electrode active material, a general solvent used for preparing the electrode slurry can be used. Specifically, the solvent may include dimethyl sulfoxide (DMSO), alcohol, N-methylpyrrolidone (NMP), acetone or water, and the solvent may be removed in a subsequent drying process.

Hereinafter, a secondary battery including the lithium composite negative electrode of the present invention will be described.

The secondary battery is manufactured by injecting electrolyte into a battery case in which an electrode assembly having a positive electrode and/or a negative electrode and a separator interposed therebetween is housed.

The positive electrode may include a structure in which the positive electrode active material layer is laminated on a current collector such as a thin film made of aluminum or an aluminum alloy. At this time, the positive electrode active material layer includes a positive electrode active material, a conductive material, and a binder, and the positive electrode active material and a conductive material may be laminated on the current collector by a binder.

The positive electrode active material is a compound capable of reversible intercalation and deintercalation of lithium (lithiated intercalation compound), and may specifically be a lithium transition metal oxide containing lithium and transition metals such as cobalt, manganese, nickel or aluminum. Furthermore, the lithium transition metal oxide may be selected from the group consisting of lithium-nickel-manganese cobalt oxide, lithium-manganese oxide, lithium-nickel-manganese oxide and lithium-manganese-cobalt oxide, and may specifically be $LiCoO_2$, $LiNiO_2$, $LiMnO_2$, $LiMn_2O_4$, $Li(Ni_aCo_bMn_c)O_2$ (herein, $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (herein, $0<Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (herein, $0<Z<2$).

In the positive electrode and the negative electrode, the current collector is not particularly limited as long as it has conductivity without causing a chemical change in the battery. For example, copper, stainless steel, aluminum, nickel, titanium, calcined carbon, what is generated by surface-treating copper or stainless steel with carbon, nickel, titanium, silver, etc., aluminum-cadmium alloy, etc. may be used. Further, fine unevenness may be formed on the surface to enhance the binding force of the negative electrode active material, and it may be used in various forms such as a film, a sheet, a foil, a net, a porous body, a foam, and a nonwoven fabric.

In addition, the conductive material used for the positive electrode or negative electrode active material layer may be added in an amount of 1 to 20% by weight based on the total weight of the positive electrode or negative electrode active material layer. The conductive material usable for the positive electrode and the negative electrode is not particularly limited as long as it has conductivity without causing a chemical change in the battery. For example, graphite such as natural graphite or artificial graphite; carbon black such as acetylene black, ketjen black, channel black, furnace black, lamp black, or thermal black; conductive fiber such as carbon fiber or metal fiber; metal powder such as carbon fluoride powder, aluminum powder, or nickel powder; conductive whisker such as zinc oxide or potassium titanate; conductive oxide such as titanium oxide; and conductive material such as polyphenylene derivative, etc. may be used.

The positive electrode and negative electrode may be prepared by processes in which a composition for electrode formation, which is generated by dispersing each electrode active material, conductive agent and binder, is applied to the current collector and then dried, or the composition for electrode formation is cast on a separate support, and then the film obtained by peeling from the support is laminated on the current collector. At this time, specifically, the solvent may include dimethyl sulfoxide (DMSO), alcohol, N-methylpyrrolidone (NMP), acetone or water, and the solvent may be removed in a subsequent drying process.

As the separator, a conventional porous polymer film generally used as a separator, for example, a porous polymer film made of polyolefin polymer such as ethylene homopolymer, propylene homopolymer, ethylene/butene copolymer, ethylene/hexene copolymer and ethylene/methacrylate copolymer can be used alone or by laminating two or more layers, or a conventional porous non-woven fabric, for example, a non-woven fabric made of high melting point glass fiber or polyethylene terephthalate fiber may be used, but is not limited thereto.

According to a method of manufacturing a lithium secondary battery according to an embodiment of the present invention, the battery assembly may be any one selected from jelly-roll type, stack type, and stack/folding type.

In addition, a battery case that is commonly used in the related art may be adopted as a battery case used in the present invention, and there is no limitation on the external shape according to the use of the battery, and may be, for example, a cylindrical shape, a square shape using a can, a pouch shape, or a coin shape.

Hereinafter, the present invention will be described in detail with reference to examples. However, the embodiments according to the present invention may be modified into various other forms, and the scope of the present invention should not be construed as being limited to the embodiments described below. The embodiments of the present invention are provided to more fully describe the present invention to those skilled in the art.

Example 1

Preparation of Lithium Composite Negative Electrode Active Material

Spherical natural graphite having an average particle diameter ($D_{50}$) of 20 μm and lithium metal in powder form having an average particle diameter ($D_{50}$) of 40 μm were mixed in a ratio of 4:1 based on the capacity (it was assumed that when calculating the capacity ratio, the theoretical capacity of lithium was 3860 mAh/g, and the theoretical capacity of artificial graphite was 360 mAh/g). After the mixture of lithium and natural graphite was put into an extruder and compressed into a pellet, the pellet was immersed in an electrolyte (as an ethyl methyl carbonate electrolyte containing $LiPF_6$, it contains 1.5 wt % of fluoro ethylene carbonate and 1.5 wt % of vinylene carbonate) for 48 hours to allow lithium ions to be incorporated into natural graphite.

Thereafter, the pellet was taken out from the electrolyte, crushed, washed with a dimethyl carbonate solvent, and dried under vacuum at room temperature to complete the preparation of a powdered lithium composite negative electrode active material.

Preparation of Negative Electrode

A negative electrode mixture slurry was prepared by adding 85% by weight of the above-mentioned powdered lithium composite negative electrode active material, 5% by weight of carbon black as a conductive material, and 10% by weight of polyvinylidene fluoride (PVdF) as a binder to N-methyl-2 pyrrolidone (NMP) as a solvent. The negative electrode mixture slurry was applied to a negative electrode plate, a copper (Cu) thin film having a thickness of 10 and dried to prepare a negative electrode, followed by roll press.

Manufacturing of Secondary Battery

A coin-type half cell was prepared by injecting ethyl methyl carbonate electrolyte containing $LiPF_6$ into an electrode assembly which is generated by sequentially stacking a negative electrode, a separator, and a lithium foil as a counter electrode.

Example 2

In the case of preparing the lithium composite negative electrode active material of Example 1, a coin-type half cell was prepared in the same manner as in Example 1 except that an electrolyte containing 3% by weight of vinylene carbonate alone was used as the electrolyte for immersing the pellet.

Example 3

When manufacturing a lithium composite negative electrode active material, a coin-type half cell was prepared in the same manner as in Example 1 except that natural graphite and powdered lithium metal were mixed in a ratio of 1:2 based on capacity.

Comparative Example 1

85% by weight of natural graphite used in Example 1, 5% by weight of carbon black as a conductive material, and 10% by weight of polyvinylidene fluoride (PVdF) as a binder were added in N-methyl-2 pyrrolidone (NMP) as a solvent, to thereby prepare a negative electrode mixture slurry. The negative electrode mixture slurry was applied to a negative electrode plate, a copper (Cu) thin film having a thickness of 10 μm, and dried to prepare a negative electrode, followed by roll press.

A coin-type half cell was prepared by injecting ethyl methyl carbonate electrolyte containing $LiPF_6$ into an electrode assembly which is generated by sequentially stacking a negative electrode, a separator, and a lithium foil as a counter electrode.

Comparative Example 2

When preparing the lithium composite negative electrode active material of the Example 1, a coin-type half cell was prepared in the same manner as in Example 1, except that the additive for forming an SEI film such as vinylene carbonate or fluoroethylene carbonate was not included in the electrolyte solution in which the pellet is immersed.

Comparative Example 3

When manufacturing a lithium composite negative electrode active material, a coin-type half cell was prepared in the same manner as in Example 1 except that natural graphite and powdered lithium metal were mixed in a ratio of 6:1 based on capacity.

Comparative Example 4

When manufacturing a lithium composite negative electrode active material, a coin-type half cell was prepared in the same manner as in Example 1 except that natural graphite and powdered lithium metal were mixed in a ratio of 1:4 based on capacity.

EXPERIMENTAL EXAMPLE

For the coin-type half cells of the above Examples and Comparative Examples, the charging capacity and the discharging capacity were measured, and the initial efficiency was calculated by the following equation, and the results are shown in Table 1. The voltage range of charging and discharging was 0.05 to 1.5 V, and charging and discharging was performed at 0.1 C to evaluate the initial efficiency.

Initial efficiency=$1^{st}$ discharge capacity×100/charge capacity

TABLE 1

| | Negative electrode active material:lithium metal capacity ratio | Initial efficiency (%) | Discharge capacity (mAh/g) |
|---|---|---|---|
| Example 1 | 4:1 | 117.24 | 343.98 |
| Example 2 | 4:1 | 101.75 | 321.34 |
| Example 3 | 1:2 | 178.58 | 242.05 |
| Comparative Example 1 | 4:0 | 84.75 | 350.52 |
| Comparative Example 2 | 4:1 | 84.45 | 234.79 |
| Comparative Example 3 | 6:1 | 85.01 | 349.07 |
| Comparative Example 4 | 1:4 | 205.65 | 161.33 |

Referring to Table 1, the lithium secondary battery according to the embodiment of the present invention was found to have much better initial efficiency compared to the lithium secondary battery of the comparative example.

In addition, in Example 3, in which the capacity ratio of the negative electrode active material and lithium metal was 1:2, initial efficiency was superior, compared to the other examples. This seems to be due to the fact that charging and discharging were performed in a state where lithium was more contained in the negative electrode of Example 3 compared to Examples 1 and 2.

In addition, in both Examples 1 and 2, the capacity ratio of the negative electrode active material and lithium was 4:1, but it was found that Example 1, in which vinylene carbonate and fluoro ethylene carbonate were used in combination as SEI additives, exhibited better initial efficiency compared to Example 2 in which vinylene carbonate was used alone. Hence, it was found that the use of vinylene carbonate and fluoro ethylene carbonate as the SEI additive included in the electrolyte was effective in maximizing the effect of the present invention.

In addition, in the case of Comparative Example 3 where the capacity ratio of the negative electrode active material is large, even though lithium metal was added, the initial efficiency was similar to that of Comparative Example 1, where lithium metal was not added, and thus the initial efficiency improvement was insufficient. In the case of Comparative Example 4 in which the capacity ratio of lithium was large, the initial efficiency was greatly increased, but there was a problem that the discharge capacity was not properly expressed due to damage to the active material.

As described above, according to a lithium composite negative electrode active material, and a negative electrode and a secondary battery including the same of the present invention, there is an effect that the initial efficiency is improved, compared with a secondary battery containing a negative electrode that does not contain lithium (Comparative Example 1) or a negative electrode (Comparative Example 2) manufactured without using SEI additive.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain the protection scope of the present invention and should be interpreted by the claims below, and it should be interpreted that all technical spirits within the equivalent scope are included in the scope of the present invention.

The invention claimed is:

1. A method for manufacturing a lithium composite negative electrode active material, the method comprising:
    a first step of preparing a pellet by extruding a mixture of lithium metal and a negative electrode active material;
    a second step of immersing the pellet in an electrolyte comprising an SEI film forming additive; and
    a third step of pulverizing, washing and drying the pellet to prepare a powder of the lithium composite negative electrode active material.

2. The method of claim 1, wherein the SEI film forming additive is at least one selected from the group consisting of a cyclic carbonate compound; a cyclic or chain carbonate-based compound comprising halogen atoms; a lithium salt comprising an oxalato complex as an anion; imide-based lithium salt; fluorophosphate-based lithium salt; fluoroborate-based lithium salt; a six-membered aromatic heterocyclic compound comprising two or more nitrogen atoms in a molecule; a sultone compound; and an acrylate-based compound.

3. The method of claim 1, wherein the SEI film forming additive is at least one selected from the group consisting of fluoro ethylene carbonate and vinylene carbonate.

4. The method of claim 3, wherein the SEI film forming additive is a mixture of fluoro ethylene carbonate and vinylene carbonate in a weight ratio of 2:1 to 1:2.

5. The method of claim 1, wherein the SEI film forming additive is present in an amount of 0.1 wt % to 5 wt % based on a total weight of the electrolyte.

6. The method of claim 1, wherein the negative electrode active material in the first step of manufacturing the pellet is a carbonaceous material.

7. The method of claim 1, wherein the negative electrode active material in the first step of manufacturing the pellet is graphite.

8. The method of claim 1, wherein in the first step of manufacturing the pellet, the negative electrode active material and the lithium metal are mixed at a capacity ratio of 5:1 to 1:3.

9. The method of claim 1, wherein in the second step of immersing the pellet in the electrolyte, lithium ions are doped with the negative electrode active material.

10. The method of claim 1, wherein a time for immersing the pellet in the electrolyte is 12 hours to 60 hours.

\* \* \* \* \*